Dec. 16, 1952 — F. TERDINA ET AL — 2,621,872
AIRCRAFT CONTROL MECHANISM
Filed June 5, 1950 — 2 SHEETS—SHEET 1

INVENTOR.
FRANK TERDINA
MAURICE F. MUZZY
BY Reynolds, Beach & Christensen
ATTORNEYS

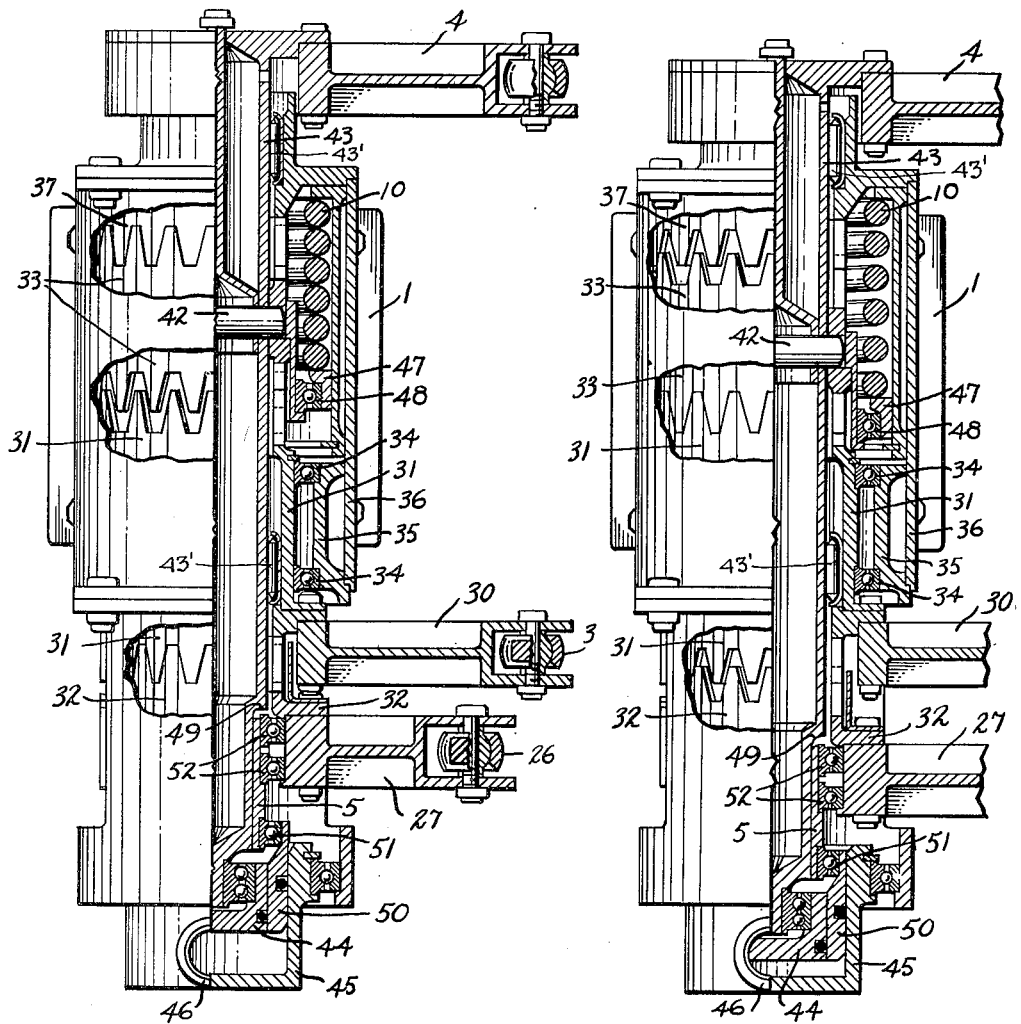

Patented Dec. 16, 1952

2,621,872

UNITED STATES PATENT OFFICE 2,621,872

AIRCRAFT CONTROL MECHANISM

Frank Terdina and Maurice F. Muzzy, Seattle, Wash., assignors to Boeing Airplane Company, Seattle, Wash., a corporation of Delaware Application June 5, 1950, Serial No. 166,282

7 Claims. (Cl. 244—82)

1

This invention relates to aircraft control mechanism and more specifically to mechanism operable preferably automatically for selective connection to one control mechanism or another.

As the size of aircraft has continued to increase, the control surfaces, particularly of the empennage, used to maneuver such aircraft, have increased in size generally correspondingly. In many types of large aircraft, therefore, devices have been employed to assist the pilot in effecting movement of an aircraft control surface. Two principal types of assisting mechanism have been employed, one of which exerts a direct mechanical force and the other of which exerts an aerodynamic force. The first type, which may be designated power mechanism, may be a hydraulic or electric power device energized by movement of the pilot's control which will exert on the control surface for swinging it a force much greater than that of which the pilot is capable.

The other type of assisting mechanism, utilizing aerodynamic forces, is an air reaction element mounted on the control surface proper, usually in the form of a trailing edge tab. Swinging of such a tab in one direction will exert a torque on the main control surface tending to swing it in the opposite direction. A disadvantage of such a tab as compared to the power type of control is that the effect which the control surface produces on the airplane for a given angle of swing is smaller. When the tab swings in one direction to move the control surface in the opposite direction, not only is the effectiveness of the control surface area represented by the tab lost, but the action of the tab, being swung oppositely to the control surface, actually detracts from the control effectiveness of the principal control surface. For that reason, if the loss occasioned by swinging of the tab relative to the control surface is taken into account, it would be necessary to utilize a control surface of larger area than would otherwise be necessary to produce a given control force on the airplane. Also the effectiveness of such an aerodynamic control in producing a torque on the control surface decreases as the angle of swing of the control surface increases, whereas the effectiveness of the power mechanism remains practically the same for all swung positions of the control surface.

An advantage of the aerodynamic type of assisting mechanism over power mechanism, however, is the reliability of the aerodynamic mechanism, because it is usually connected to the pilot's control by comparatively simple linkage subject to failure only by being overstressed.

2

Where power mechanism is employed, however, if the hydraulic system should fail because of a defective pump, line leakage, or for some other reason, or if an electric power mechanism should fail for lack of power or by reason of a faulty connection, some provision must be made for maintaining control of the airplane even though greater than normal effort must be exerted by the pilot.

A general object of the present invention, therefore, is to provide mechanism more effective than direct mechanical connection between the pilot's control and the principal control surface to assist the pilot in swinging the control surface upon failure of the power mechanism. Such emergency assisting mechanism of the aerodynamic type may be, for example, a trailing edge tab, which can be swung by the pilot to eccomplish swinging of the principal control surface in case of power mechanism failure.

A further object of the invention in providing both a power control mechanism and an aerodynamic assisting mechanism is to arrange these so that under normal conditions the power mechanism can operate the control surface without its effectiveness being reduced by movement of the aerodynamic assisting mechanism. Specifically this is accomplished by the present control mechanism effecting movement of the tab as an integral part of the principal control surface, as long as the power mechanism is operative to effect swinging of the control surface.

A more particular object of the invention is to provide power control mechanism and aerodynamic assisting mechanism which can be operatively connected alternatively to the same pilot-operated control. It is another feature to effect disconnection of the power mechanism from the pilot's control and to effect connection of the aerodynamic assist mechanism to the pilot's control automatically in case of power mechanism failure. To insure such interchangeability of connection at all times, a lost motion coupling arrangement is provided so that the control can be firmly coupled to one central actuating mechanism and still be loosely coupled to the other to preserve approximate synchronization between the control and both control actuating devices at all times. While having the capabilities mentioned above, the mechanism of this invention is simple and compact, employing a minimum of parts which can be incorporated in the space between the power mechanism and the control surface without requiring drastic rearrangement of the conventional control surface power drive installation. Moreover, such mechanism may be consolidated in a fully enclosed unit, so that the working parts are well protected.

In accomplishing the above mentioned objects in a system employing power mechanism of the hydraulic type, a double-acting clutch may be provided between the pilot-operated control and such power mechanism on one hand and the aerodynamic assisting mechanism on the other hand. Such clutch may be held in position to interconnect the pilot-operated control with the power mechanism by pressure of the liquid for operating the power mechanism, whereas, when such pressure fails, the clutch mechanism will automatically be shifted to disengage the power mechanism from the pilot's control and to connect the aerodynamic assisting mechanism to such pilot-operated control. The power mechanism will be operatively connected to the principal control surface at all times and, when such power mechanism is operative, the clutch will maintain the aerodynamic assisting mechanism in fixed relationship to the principal control surface to constitute, in effect, an integral part of it.

Moreover, in both positions of the clutch, the pilot's control is connected by a lost motion connection directly to the principal control surface, so that, if both assisting mechanisms should fail to accomplish the desired movement of the control surface, the pilot may still apply a direct force to it.

Further advantages of the particular mechanism employed in carrying out the invention will be pointed out in the following detailed description of the representative type of mechanism shown in the accompanying drawings.

Figure 3 is an elevation view of a preferred type of clutch mechanism with parts broken away to show interior structure with the parts in the operative position corresponding to the illustration of Figure 1, and Figure 4 is a similar view with the parts shifted to the positions corresponding to those of Figure 2.

Since various types of control surface installations are well known in the aircraft art, it is considered to be unnecessary in describing the present invention to illustrate any specific type of control surface or control surface installation. The mechanism of this invention may be applied or modified for application to a wide variety of such installations. For the purpose of the present discussion, however, and by way of a typical example, it may be considered that the mechanism is applied to a swingable rudder, because it will probably be used most frequently for application to rudders.

Figure 1:
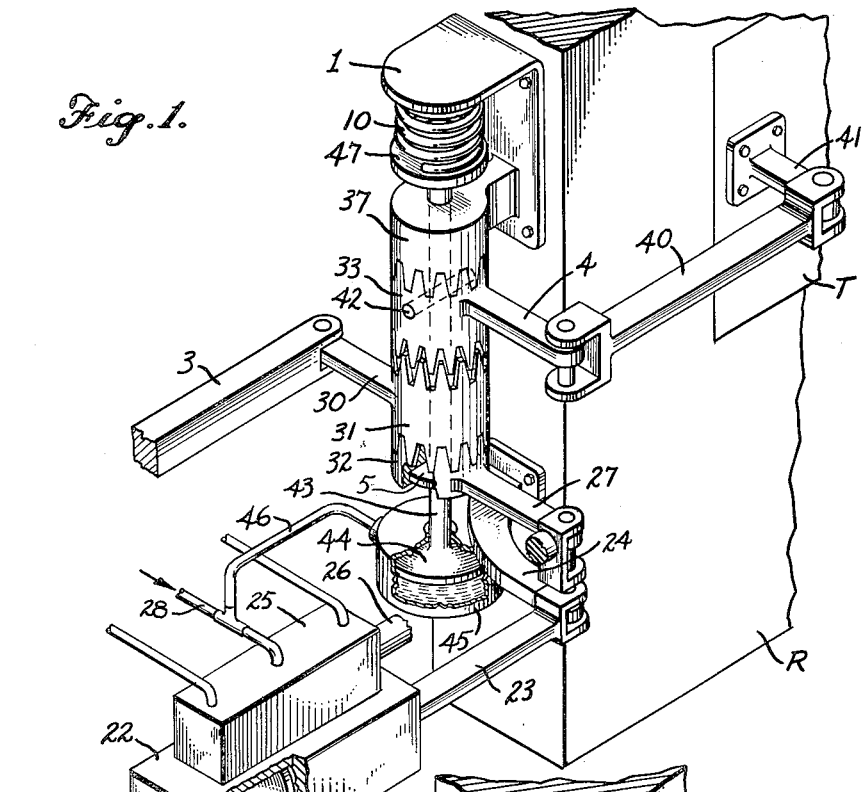
Figure 1 is a somewhat diagrammatic top perspective view of the mechanism showing parts in their normal operating position with the aerodynamic assisting mechanism in the form of a tab locked integrally with the principal control surface for movement with it, and the pilot's control operatively connected to the power mechanism.

In Figure 1 the forward edge portion of the rudder R, illustrated quite diagrammatically, carries the mechanism of this invention mounted on a base bracket 1 which is attached to the rudder. The tab T also is shown diagrammatically, but is to be understood as being hingedly mounted in conventional fashion on the rudder R. This tab constitutes a representative type of aerodynamic assisting mechanism, which is swung in one direction to effect swinging of the principal control surface R in the opposite direction.

The power mechanism for the control surface R, which is normally operative to swing it directly, is of conventional type, and consequently it likewise is shown in diagrammatic fashion. Specifically, the power mechanism includes the piston 2 carried by the piston rod 20 which is pivotally mounted on a suitable bracket 21 secured to a stationary part of the airplane. The cylinder 22, in which the piston 2 is received, reciprocates relative to this piston and bracket 21, and is pivotally connected by an arm 23 to a horn 24 secured to the control surface R. Such horn may, for example, be mounted on the pivoted edge of the control surface. On the cylinder 22 is mounted slide valve mechanism 25 which controls the supply of liquid under pressure to one side or the other of piston 2 within cylinder 22, while at the same time connecting the cylinder chamber on the other side of the piston to a return line.

The valve itself of the valve mechanism 25 is shifted by reciprocation of the valve rod 26, moved by swinging of lever 27 to which it is pivotally connected. The pivotal connection between rod 26 and lever 27 normally is aligned with the pivot axis between arm 23 and horn 24 so that, when the lever 27 and rod 26 are moved to shift the valve of mechanism 25, the resulting movement of cylinder 22 will shift arm 23 and the control surface until the cylinder has moved relative to rod 26 so as to restore the valve mechanism to neutral position. This follow-up movement of the valve mechanism interrupts movement of the control surface by the power mechanism when the pivot between arm 23 and horn 24 has again reached substantial alignment with the pivot between rod 26 and arm 27. This power mechanism and its connection to the control surface are conventional.

Figure 2:
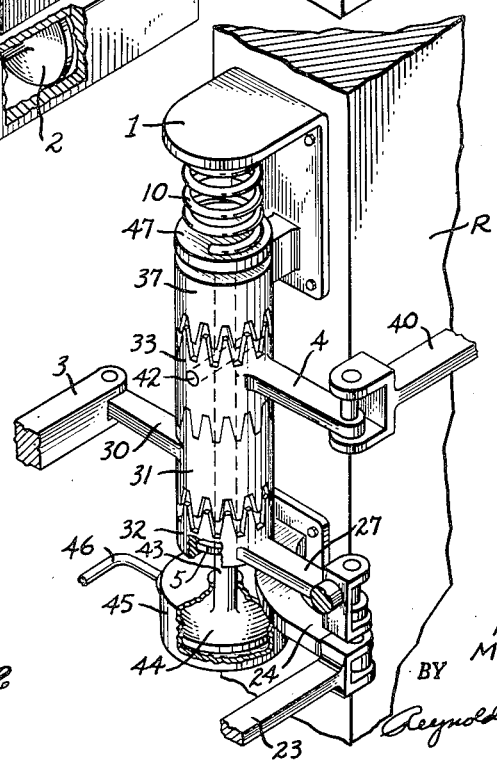
Figure 2 is a somewhat diagrammatic top perspective view corresponding to Figure 1 but showing the parts of the mechanism in emergency operative relationship, the pilot's control being operatively connected to the aerodynamic assisting mechanism in the form of a tab and operatively disconnected from the power mechanism.

Ordinarily the bar 3, reciprocated lengthwise by the pilot's control, would be connected directly to arm 27 to swing it for reciprocating valve rod 26. In accordance with this invention, however, clutch mechanism is interposed between this arm and the bar operated by the pilot. Thus the bar 3 is pivotally connected to an arm 30 carried by a rotatable clutch collar 31. This collar has on one end teeth complemental to teeth on the adjacent end of a cooperating clutch ring 32 which is integral with arm 27 and arranged coaxially with the clutch collar 31, as shown in Figures 1 and 2.

The end of clutch collar 31 remote from clutch ring 32 also is provided with teeth which, in this instance, are complemental to teeth on the adjacent end of a second clutch ring 33. While collar 31 is held against axial movement, such as by a thrust bearing 34 shown in Figure 3 carried by a sleeve 35 secured in one end of casing 36, which casing is mounted on bracket 1, clutch rings 32 and 33, at opposite ends of collar 31, are carried by a common member 43 in positions spaced apart axially a fixed distance, while being rotatively independent except as their rotation is correlated by clutch collar 31. Such clutch rings are thus interconnected for conjoint axial movement between the positions shown in Figure 1 and Figure 2. In the positions of rings 32 and 33 in Figure 1 the teeth of clutch ring 32 are firmly enmeshed with the co-operating teeth of clutch collar 31 while the cooperative teeth of clutch ring 33 and clutch collar 31 are still sufficiently overlapped to maintain their registry, yet, because of the taper of such teeth, they are operatively disengaged within reasonable limits of relative angular movement. With the parts in the positions shown in Figure 2, the teeth of clutch ring 33 are firmly engaged with the cooperative teeth of clutch collar 31, and the teeth of clutch ring 32, while still overlapped with them sufficiently to maintain registry, are operatively disengaged from the other teeth of collar 31. It is desirable that axial conjoint shifting of clutch rings 32 and 33 be incapable of removing the teeth of either of them completely from registry with the respectively cooperating teeth of clutch collar 31, so that the two clutch elements 32 and 33 cannot rotate relatively out of proper phase relationship with each other and with clutch collar 31. At the same time sufficient lost motion will be provided between the teeth of one or the other sets of clutch elements so that the movement of bar 3 might effect controlling rotation of either clutch ring 32 or 33 without effecting controlling operation of the other. Such operation is possible because of the follow-up effect of control surface movement which tends to maintain clutch collar 31 and clutch rings 32 and 33 in generally corresponding rotative relationship.

Cooperating with clutch ring 33 is a further clutch element 37, having teeth arranged to mesh with teeth on the end of ring 33 remote from collar 31. This clutch element is carried directly by the casing 36 which is mounted on rudder R by bracket 1, and fixed against rotation relative to the rudder.

In Figure 1, the parts of the mechanism are in their relative positions for normal operation of the control surface by the power mechanism. Clutch ring 33, having the teeth on its upper end in close mesh with clutch element 37 mounted rigidly on the control surface, will not enter into the operation of the control. This clutch ring, however, forms part of the emergency alternative operating mechanism for the control surface which will come into play automatically if the power mechanism should become inoperative because of failure of hydraulic pressure. Specifically, clutch ring 33 is maintained in the axial position shown in Figure 1 by the same hydraulic pressure available to operate the hydraulic power mechanism.

The alternative or emergency control includes an arm 4 pivotally connected to a link 40 which in turn is pivoted to a horn 41 mounted on the control surface tab T for effecting swinging of it. Clutch ring 33 is secured, such as by a pin 42, to an axially reciprocable shaft 43, shown diagrammatically in Figures 1 and 2 as a rod, and in Figures 3 and 4 as a tube. This shaft carries at one end a piston 44 which is reciprocable within a cylinder 45 containing liquid supplied through a pipe 46. Such pipe is connected to the supply pipe 28 for the hydraulic power mechanism 22. Opposing the hydraulic pressure on piston 44 in cylinder 45 is a spring 10 which reacts from the control surface, shown diagrammatically as through bracket 1 in Figure 1, and through casing 36 in Figure 3, and bears against a ledge 47 carried by the clutch mechanism shaft 43. In Figure 1, this ledge is shown diagrammatically as the peripheral portion of a plate mounted on the end of the clutch shaft, whereas in Figure 3 it is shown as an annular ring rotatively separated from shaft thrust bearing 48.

Clutch ring 32 is interconnected with clutch ring 33 to reciprocate conjointly with it, but these rings are rotatively independent. In Figure 1 such interconnection is illustrated in the form of a circular plate 5 secured to shaft 43 and having its periphery received in an annular groove of clutch ring 32. In the mechanism shown in Figures 3 and 4 the element 5 is not mounted directly on shaft 43, but rather is a sleeve operatively interconnected for axial movement with it in both directions. In one direction of axial movement such sleeve is shifted with the shaft 43 by the annular piston 50, which is secured to the sleeve for conjoint reciprocation preferably by an annular antifriction bearing 51 to enable relative rotation between these parts. Conjoint reciprocation in the opposite direction by spring 10 is assured by engagement of shoulder 49 of shaft 43 with the upper end of sleeve 5 or the antifriction bearings 52 secured to such sleeve. On these bearings is mounted the composite structure including clutch ring 32 and arm 27.

It will be evident that as long as adequate hydraulic pressure is maintained on annular piston 50 and the central piston 44 snugly received within such annular piston, as shown in Figure 3, clutch rings 32 and 33 will be urged into their positions shown in Figures 1 and 3 in opposition to the force of spring 10. When the hydraulic pressure is reduced below a predetermined value, however, this spring will reciprocate the two clutch rings in the opposite direction, to the position shown in Figures 2 and 4. To permit such movement arms 4 and 27 must be displaceable, or some sort of lost motion connection must be provided. In Figures 1 and 2 such a connection is illustrated merely as a long pivot pin in each of the yoke members receiving the ends of these arms, respectively. Actually it is preferable to utilize links having suitable universal tilting connections with the ends of these arms, and such ball joint connections are shown in Figures 3 and 4.

It may be pointed out that the formation of shaft 43 in the mechanism shown in Figures 3 and 4 as a tube provides a strong, light construction. This shaft is supported in needle bearings 43' which enable the shaft to slide while holding it firmly against tilting. Limited rotation of arm 4, shaft 43 and clutch ring 33 relative to clutch element 37 is thus afforded with minimum friction. By the lower bearing 34 arm 30 and clutch ring 31 are rotatively isolated from the shaft 43. Since sleeve 5 is separated from piston 50 by bearing 51 and from arm 27 by bearings 52, this sleeve may rotate quite freely with shaft 43.

It will be noted that in the clutching mechanism described, the parts are arranged almost entirely concentrically so that the mechanism is very compact. Moreover, because of this arrangement, the entire operating unit may be housed conveniently in a cylindrical casing from which the operating levers or arms project generally radially. As long as the hydraulic pressure for the power mechanism is maintained, the tab T acts as an integral part of the control surface R and the power mechanism swings it in normal fashion. Upon excessive reduction in pressure of the hydraulic liquid, however, the spring 10 will automatically shift shaft 43 lengthwise to release the clutch ring 33 from the clutch element 37 so that limited relative movement between the tab and the control surface may be effected and simultaneously the teeth of this clutch ring will be meshed firmly with the teeth of clutch collar 31. By the same movement of shaft 43 the power-operative clutch ring 32 will be withdrawn from the clutch collar 31 so that the pilot's control arm 4 will now operate the assisting tab to swing the control surface, instead of reliance being placed on the power mechanism which has become inoperative by the drop in pressure of the hydraulic fluid.

Operation of the automatic control mechanism to shift the clutch so that the pilot's control operates the aerodynamic assisting mechanism instead of the power mechanism upon failure of the latter for any reason does not require that even then sole reliance be placed on the aerodynamic assisting mechanism. Although the shaft 43 has been shifted downward to engage the teeth of clutch ring 33 firmly with the teeth of clutch collar 31, the teeth on the opposite side of clutch ring 33 are still in registry with teeth of the clutch element 37 which is fixedly secured to the control surface R. As has been discussed previously, an aerodynamic assisting mechanism, such as a tab, stalls out after the control surface, such as the rudder, has been swung to a predetermined reasonably large angle of incidence. When the control surface fails to be swung farther by continued swinging of the tab, the loosely meshed teeth of the clutch ring 33 and of the clutch element 37 will eventually come into engagement, whereupon direct force is applied by the pilot through the clutch collar 32 and the clutch ring 33 to the clutch element 37 attached to the control surface. The torque thus directly applied to the control surface will supplement the aerodynamic force on the tab to continue swinging the control surface to a greater angle of incidence.

While it is true that under these conditions the loosely meshing teeth of clutch collar 32 and clutch ring 31 will probably also be in engagement, the power control will not produce any resistance to further swinging of the control surface because of by-passes provided in the power mechanism which will permit it to yield under such conditions. Such a by-pass system is well known in the art and consequently is not shown in this application.

Thus while normally the pilot's control will operate the power mechanism to swing the control surface, in cases of emergency, when the power mechanism is rendered inoperative, an aerodynamic assisting mechanism will automatically be operatively connected to produce the principal force for swinging the control surface. In case of extreme angles of control surface swing being required, however, the force exerted by the pilot will still be transmitted as a last resort directly to the control surface so that under no circumstances will the pilot's control be operatively disconnected from the control surface.

We claim as our invention:

1. Actuating mechanism for a control surface comprising a pilot-operated control, an aerodynamic assisting tab mounted on the control surface, a toothed clutch collar operatively connected to said pilot-operated control and rotatable thereby, a toothed clutch element aligned with said clutch collar and secured to the control surface, a toothed clutch ring aligned with said clutch collar and said clutch element, disposed therebetween, having its teeth always in mesh with the teeth both of said clutch collar and of said clutch element and operatively connected to said tab, and means shiftable axially relative to said clutch collar to engage firmly teeth of said clutch ring with teeth of said clutch collar while moving into loose registry teeth of said clutch ring and teeth of said clutch element.

2. Actuating mechanism for a control surface comprising a pilot-operated control, hydraulic power mechanism supplied with liquid by a source of liquid under pressure and operatively connected to the control surface, aerodynamic assisting mechanism operatively connected to the control surface, a clutch collar operatively connected to said pilot-operated control and rotatable thereby, two clutch rings located at opposite sides of and disposed concentrically with said clutch collar, and operatively connected, respectively, to said power mechanism and to said aerodynamic assisting mechanism, a shaft interconnecting said clutch rings in definitely spaced relationship and shiftable axially relative to said clutch collar to engage firmly either one of said clutch rings with said clutch collar while operatively disengaging the other of said clutch rings from said clutch collar but maintaining them in lost motion registry, hydraulic means supplied by liquid under pressure from the same source as supplies said hydraulic power mechanism, and operable by the pressure of liquid exceeding a predetermined value to maintain said shaft in position for holding said power mechanism connected clutch ring firmly in engagement with said clutch collar and said aerodynamic assisting mechanism connected clutch ring operatively disengaged from said clutch collar, and means operable upon predetermined reduction of the pressure of the liquid supplied to said hydraulic pressure means to shift said shaft axially and to effect firm engagement of the aerodynamic assisting mechanism connected clutch ring with said clutch collar and to operatively disengage said power mechanism connected clutch ring from said clutch collar.

3. Actuating mechanism for a control surface comprising a pilot-operated control, power mechanism operatively connected to the control surface, an aerodynamic assisting tab mounted on the control surface, a toothed clutch collar operatively connected to said pilot-operated control and rotatable thereby, a toothed clutch element aligned with said clutch collar and secured to the control surface, a toothed clutch ring aligned with said clutch collar and said clutch element, disposed therebetween, having its teeth always in mesh with the teeth both of said clutch collar and said clutch element and operatively connected to said tab, a second toothed clutch ring aligned with said clutch collar, said clutch element and said first clutch ring, located at the side of said clutch collar remote from said first clutch ring, and operatively connected to said power mechanism, a shaft interconnecting said clutch rings in definitely spaced relationship and shiftable axially relative to said clutch collar to engage firmly teeth of either one of said clutch rings with teeth of said clutch collar while moving into loose registry teeth of the other of said clutch rings and teeth of said clutch collar, means normally operable to retain said shaft in position to maintain teeth of said first clutch ring in engagement with teeth of said clutch element, to hold said tab against movement relative to the control surface, and to maintain teeth of second clutch ring in firm engagement with teeth of said clutch collar, and means operable by failure of said power mechanism to shift said shaft axially to move said second clutch ring to shift its teeth from firm engagement into loose registry with the teeth of said clutch collar and to move said first clutch ring to shift its teeth from firm engagement into loose registry with the teeth of said clutch element and to engage firmly teeth of said first clutch ring with teeth of said clutch collar.

4. Actuating mechanism for a control surface comprising a pilot-operated control, power mechanism operatively connected to the control surface, aerodynamic assisting mechanism operatively connected to the control surface, and clutch means including a first clutch element operatively connected to said aerodynamic assisting mechanism, a second clutch element operatively connected to said power mechanism, and a third clutch element operatively connected to said pilot-operated control and engageable with said first clutch element to connect said pilot-operated control to said aerodynamic assisting mechanism, and alternatively engageable with said second clutch element to connect said pilot-operated control to said power mechanism.

5. The actuating mechanism defined in claim 4, in which the clutch mechanism includes a fourth clutch element operatively connected to the control surface for movement therewith and engageable with the first clutch element when it is out of engagement with the third clutch element to secure the aerodynamic assisting mechanism and the control surface together into an integral unit for conjoint movement.

6. The actuating mechanism defined in claim 5, and means interconnecting the first clutch unit and the second clutch unit for conjoint shifting and operable to effect engagement simultaneously of the second clutch unit with the third clutch unit, and of the first clutch unit with the fourth clutch unit.

7. Actuating mechanism for a control surface comprising a pilot-operated control, an aerodynamic assisting tab mounted on the control surface, and clutch means including a first clutch element operatively connected to said pilot-operated control, a second clutch element operatively connected to the control surface for rotation therewith, and a third clutch element operatively connected to said aerodynamic assisting tab and engageable with said first clutch element to connect said pilot-operated control and said tab for enabling said tab to be swung relative to the control surface by movement of the pilot-operated control, and alternatively engageable with said second clutch element to lock said tab and the control surface into an integral unit for conjoint movement.

FRANK TERDINA.
MAURICE F. MUZZY.

REFERENCES CITED

The following references are of record in the file of this patent:

UNITED STATES PATENTS

| Number | Name | Date |
|---|---|---|
| 2,183,932 | Carlson | Dec. 19, 1939 |
| 2,272,725 | Overbeke | Feb. 10, 1942 |
| 2,392,381 | Hanson et al. | Jan. 8, 1946 |
| 2,395,671 | Kleinhans et al. | Feb. 26, 1946 |
| 2,472,653 | Eaton | June 7, 1949 |

FOREIGN PATENTS

| Number | Country | Date |
|---|---|---|
| 621,212 | Great Britain | Apr. 6, 1949 |

OTHER REFERENCES

"Aircraft Engineering," monthly magazine, pp. 274–277, Sept. 1949.